(12) United States Patent
Hirose

(10) Patent No.: US 10,442,468 B2
(45) Date of Patent: Oct. 15, 2019

(54) METAL PIPE AND STRUCTURAL MEMBER USING METAL PIPE

(71) Applicant: NIPPON STEEL & SUMITOMO METAL CORPORATION, Tokyo (JP)

(72) Inventor: Satoshi Hirose, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/088,479

(22) PCT Filed: Mar. 28, 2017

(86) PCT No.: PCT/JP2017/012663
§ 371 (c)(1),
(2) Date: Sep. 26, 2018

(87) PCT Pub. No.: WO2017/170561
PCT Pub. Date: Oct. 5, 2017

(65) Prior Publication Data
US 2019/0118865 A1    Apr. 25, 2019

(30) Foreign Application Priority Data

Apr. 1, 2016    (JP) .................................. 2016-073951

(51) Int. Cl.
*B62D 21/15*    (2006.01)
*B60J 5/04*    (2006.01)
(Continued)

(52) U.S. Cl.
CPC ............ *B62D 21/157* (2013.01); *B60J 5/042* (2013.01); *B60J 5/0443* (2013.01); *B60R 19/04* (2013.01);
(Continued)

(58) Field of Classification Search
CPC .. B60J 5/04; B60J 5/042; B60J 5/0443; B60R 19/02; B60R 19/18; B62D 21/02; B62D 21/15; B62D 21/157; C21D 9/08
(Continued)

(56) References Cited

U.S. PATENT DOCUMENTS 5,584,510 A * 12/1996 Thuliez .................. B62D 21/02
                                                        180/65.1
6,296,299 B1 * 10/2001 Hanakawa ............. B60J 5/0443
                                                        293/109
(Continued)

FOREIGN PATENT DOCUMENTS

JP          04-143225          5/1992
JP          2001-321844        11/2001
(Continued)

*Primary Examiner* — Jason S Daniels
(74) *Attorney, Agent, or Firm* — Clark & Brody

(57) ABSTRACT

A metal pipe has a circular cross section with an outer diameter D and a length not less than 6D. The metal pipe includes a high-strength portion (1A) and low-strength portions (1B). The high-strength portion (1A) is disposed along the entire circumference of the metal pipe to extend a dimension, as measured in the longitudinal direction of the metal pipe, that is not less than (⅔)D and not more than 3D of the metal pipe. The high-strength portion (1A) has a yield strength not less than 500 MPa (or a tensile strength not less than 980 MPa). The low-strength portions (1B) are disposed along the entire circumference of the metal pipe to be arranged in the longitudinal direction of the metal pipe to sandwich the high-strength portion (1A). The low-strength portions (1B) have a yield strength of 60 to 85% of that of the high-strength portion (1A).

9 Claims, 12 Drawing Sheets

(51) Int. Cl.
   *B60R 19/18* (2006.01)
   *C21D 9/08* (2006.01)
   *F16F 7/12* (2006.01)
   *B62D 21/02* (2006.01)
   *B62D 29/00* (2006.01)
   *B60R 19/04* (2006.01)

(52) U.S. Cl.
   CPC .............. *B60R 19/18* (2013.01); *B62D 21/02* (2013.01); *B62D 21/152* (2013.01); *B62D 29/007* (2013.01); *C21D 9/08* (2013.01); *F16F 7/12* (2013.01); *F16F 7/123* (2013.01); *B60R 2019/1813* (2013.01)

(58) Field of Classification Search
   USPC ..... 296/146.6, 187.09, 187.12; 293/121, 122
   See application file for complete search history.

(56) References Cited

U.S. PATENT DOCUMENTS

2016/0368536 A1\* 12/2016 Cazes ................. C21D 9/0068
2018/0126934 A1\* 5/2018 Nagayama .............. B60R 19/04

FOREIGN PATENT DOCUMENTS

| JP | 2003-225716 | 8/2003 |
| JP | 2003-531073 | 10/2003 |
| JP | 2009-057620 | 3/2009 |
| JP | 2009-101849 | 5/2009 |
| JP | 2010-236560 | 10/2010 |
| JP | 2011-037313 | 2/2011 |
| JP | 5137322 | 2/2013 |
| JP | 2014-024074 | 2/2014 |
| WO | 2005/058624 | 6/2005 |

\* cited by examiner

METAL PIPE AND STRUCTURAL MEMBER USING METAL PIPE

TECHNICAL FIELD

The present invention relates to an impact-resistant metal pipe and a structural member using such a metal pipe.

BACKGROUND ART

Metal pipe having a circular cross section, that is, round pipe, is highly economical and has broad utility. Round pipe is thus used in various applications. For example, round pipe is used as a structural member in a vehicle, a building, or a large container. Such structural members are required to have resistance against impact, or impact resistance.

For example, WO 2005/058624 (Patent Document 1) discloses a metal pipe to be mounted on the vehicle body of an automobile with both ends supported thereon to provide impact resistance. This metal pipe has a bent portion that runs its entire length or just a portion of its length. The metal pipe is disposed such that the outer side of the bent portion is generally oriented toward the direction of a possible impact applied to the vehicle body. This metal pipe has better impact resistance than a reinforcement member made of straight pipe to reinforce the vehicle body.

PRIOR ART DOCUMENTS

Patent Documents

Patent Document 1: WO 2005/058624

SUMMARY OF THE INVENTION

Problems to be Solved by the Invention

When a metal pipe receives an impact exceeding its yield strength, it is bent sharply such that the sharply bent portion protrudes. As a wall thickness of the metal pipe is reduced to reduce weight, an extent of protrusion occurring when the pipe is sharply bent by an impact tends to increase. If the metal pipe is used as a structural member, for example, it is preferable to reduce the extent of protrusion occurring when the metal pipe receives an impact from a collision and is sharply bent, to protect a passenger.

In view of this, the present application discloses a metal pipe that protrudes to a reduced extent when it is deformed by impact, and a structural member using such a metal pipe.

Means for Solving the Problems

A metal pipe according to an embodiment of the present invention is a metal pipe having a circular cross section with an outer diameter D and a length not less than 6D. The metal pipe includes a high-strength portion and low-strength portions. The high-strength portion is disposed along an entire circumference of the metal pipe to extend a dimension, as measured in a longitudinal direction of the metal pipe, that is not less than (⅔)D and not more than 3D. The high-strength portion has a yield strength not less than 500 MPa (or a tensile strength not less than 980 MPa). The low-strength portions are disposed along the entire circumference of the metal pipe to be arranged in the longitudinal direction of the metal pipe to sandwich the high-strength portion. The low-strength portions have a yield strength of 60 to 85% of that of the high-strength portion.

Effects of the Invention

The present disclosure provides a metal pipe that protrudes to a reduced extent when it is deformed by an impact, and a structural member using such a metal pipe.

EMBODIMENTS FOR CARRYING OUT THE INVENTION

Figure 1A:
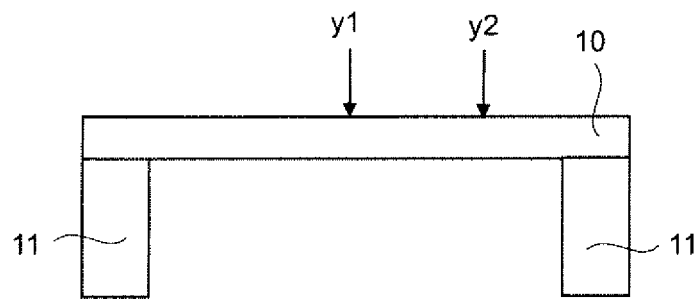
FIG. 1A shows an exemplary construction of a round pipe with its both ends supported.

The inventors investigated a behavior of a round pipe used as a structural member against an impact. If the round pipe is used as the structural member, the round pipe forms a part of a structure (for example, a vehicle, building or container) with its both ends supported, as shown in FIG. 1A, for example. The inventors examined the behavior of a round pipe with supported ends against an impact and found that the extent of deformation caused by an impact may become significant when the length of the round pipe is about six times its diameter or larger.

Figure 1B:
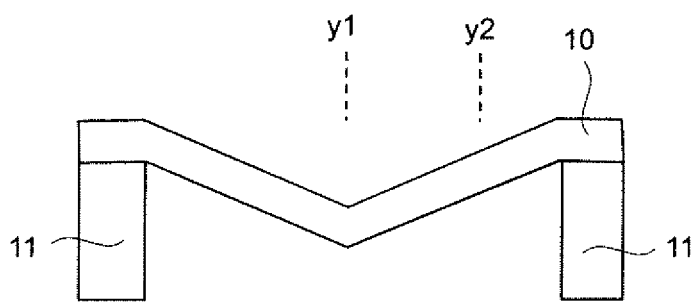
FIG. 1B shows an exemplary deformation behavior of the round pipe of FIG. 1A.
Figure 1C:
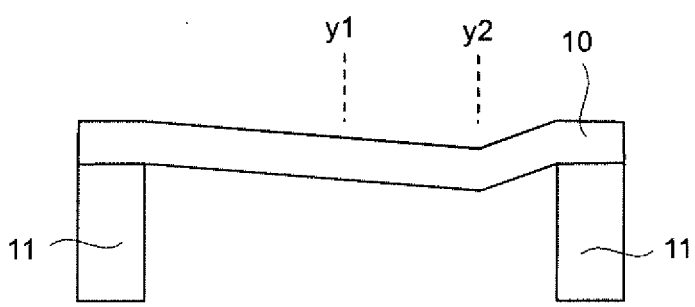
FIG. 1C shows another exemplary deformation behavior of the round pipe of FIG. 1A.

For example, when an impact is applied to the middle (y1 in FIG. 1A), as determined along the longitudinal direction, of a round pipe with its both ends supported, the round pipe is deformed and sharply bent early after the impact (see FIG. 1B). The extent of protrusion of this early sharp bend is larger than the extent of protrusion associated with the deformation found when an impact has been applied to a position (y2 in FIG. 1A) between the middle of the round pipe along the longitudinal direction and one supported portion (see FIG. 1C). An analysis demonstrated that the load of a moment is highest when an impact is applied to the middle, along the longitudinal direction, of a round pipe with its both ends supported.

The inventors did research to reduce the extent of deformation of a round pipe caused by an impact by increasing the strength of the round pipe or optimizing its shape. However, the extent of protrusion associated with deformation does not change even when the strength of the round pipe is increased. Further, changing the shape of the round pipe eliminates advantages of the round pipe: for example, the pipe is not economical anymore, and loses its broad utility. In view of this, the inventors did further research to prevent sharp bending by changing the strength distribution in the round pipe.

The inventors extensively investigated the material strength of and strength distribution in a round pipe, and arrived at an arrangement in which the round pipe has low-strength portions with a lower strength than other portions, the low-strength portions being arranged in the longitudinal direction. That is, the inventors arrived at an arrangement in which low-strength portions with a lower strength than a high-strength portion is disposed along the entire circumference of the round pipe to sandwich the high-strength portion. The inventors found that, in this arrangement, a load derived from an impact applied to the high-strength portion is transmitted to the low-strength portions to prevent sharp-bend deformation. Then, after further trials and errors, the inventors found that the extent of deformation caused by an impact against the high-strength portion can be effectively reduced by optimizing the strength of the high-strength portion, the strength ratio of the low-strength portions to the high-strength portion, and the longitudinal dimension of the high-strength portion. Based on these findings, the inventors arrived at the round pipe of the embodiment described below.

Embodiments

Figure 2A:
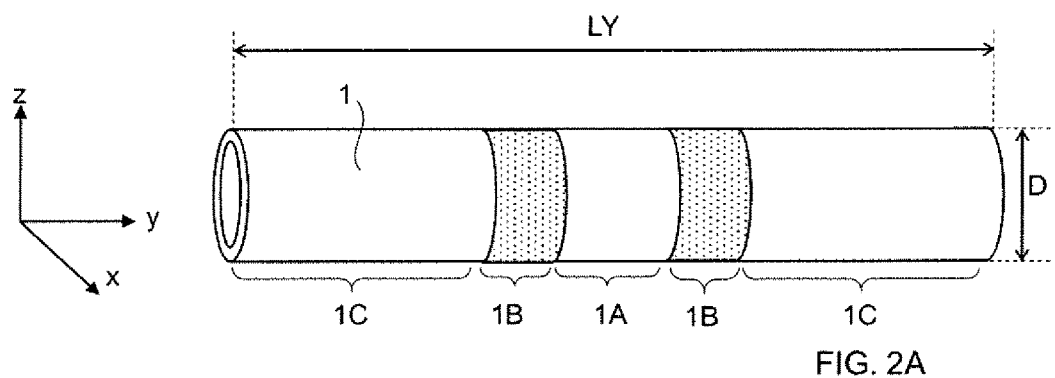
FIG. 2A is a perspective view of the construction of a metal pipe 1 according to the present embodiment.
Figure 2B:
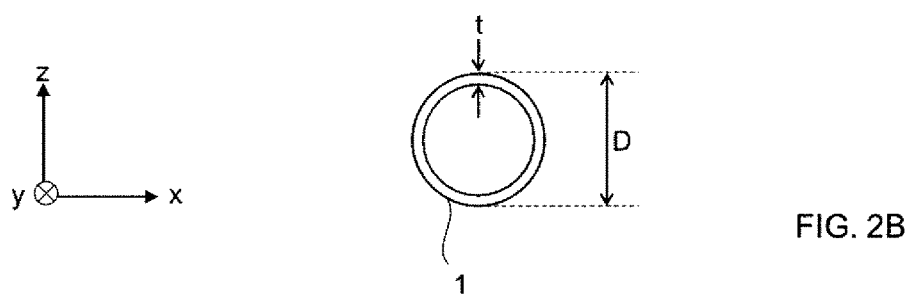
FIG. 2B is a side view of the metal pipe of FIG. 2A as viewed in the y-direction.
Figure 2C:
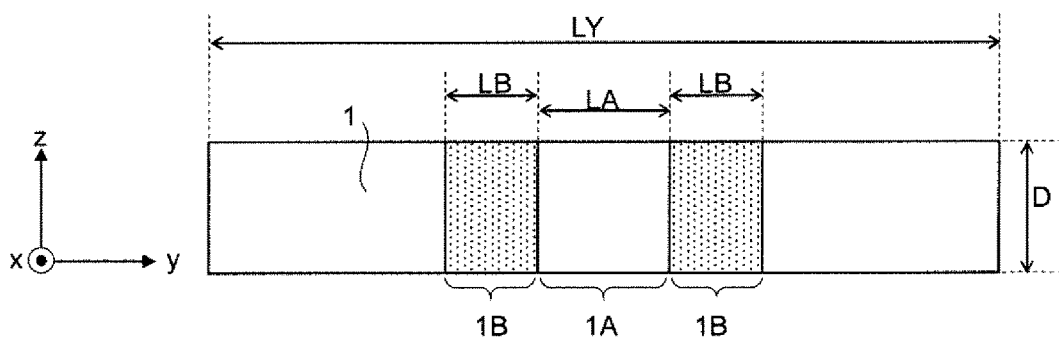
FIG. 2C is a side view of the metal pipe of FIG. 2A as viewed in the x-direction.

FIG. 2A is a perspective view of the construction of a metal pipe 1 according to the present embodiment. FIG. 2B is a side view of the metal pipe 1 of FIG. 2A as viewed in the longitudinal direction (i.e. y-direction). FIG. 2C is a side view of the metal pipe 1 of FIG. 2A as viewed in a direction perpendicular to the longitudinal direction (i.e. x-direction).

As shown in FIGS. 2A and 2B, the metal pipe 1 has a circular cross section with an outer diameter D, and has a length LY equal to or larger than 6D. The metal pipe 1 includes a high-strength portion 1A and low-strength portions 1B sandwiching the high-strength portion. The high-strength portion 1A and low-strength portions 1B are disposed along the entire circumference of the metal pipe 1. As shown in FIG. 2C, as measured in the longitudinal direction of the metal pipe 1 (i.e. y-direction), the high-strength portion 1A extends a dimension LA that is not less than ($\frac{2}{3}$)D and not more than 3D (($\frac{2}{3}$)D$\leq$LA$\leq$3D), where D is the outer diameter. The distance between the pair of low-strength portions 1B is equal to the size LA of the high-strength portion 1A. The high-strength portion 1A has a yield strength not less than 500 MPa (or a tensile strength not less than 980 MPa). The yield strength of the low-strength portions 1B is 60 to 85% of that of the high-strength portion 1A. Similarly, the tensile strength of the low-strength portions 1B is 60 to 85% of the tensile strength of the high-strength portion 1A.

The yield strength of the portions other than the high-strength portion 1A and low-strength portions 1B, i.e. the portions 1C located longitudinally outward of the low-strength portions 1B, is equal to or larger than that of the low-strength portions 1B. For example, the yield strength of the portions 1C located longitudinally outward of the low-strength portions 1B may be equal to the yield strength of the high-strength portion 1A. In the present implementation, the low-strength portions 1B are the portions having low yield strengths than the surrounding portions.

Disposing the low-strength portions 1B sandwiching the high-strength portion 1A along the entire circumference, as shown in FIGS. 2A to 2C, allows the deformation caused by an impact load to be dispersed to the low-strength portions 1B, rather than being concentrated in the high-strength portion 1A. To do this, the following three requirements need to be met: First, the high-strength portion 1A should have a yield strength not less than 500 MPa (a tensile strength not less than 980 MPa). Second, the strength ratio of the low-strength portions 1B to the high-strength portion 1A should be in a range of 60 to 85%. Third, the size LA of the high-strength portion 1A should be not less than ($\frac{2}{3}$)D and not more than 3D, where D is the outer diameter. This will allow the deformation caused by a load derived from an impact against the high-strength portion 1A to be dispersed early to the low-strength portions 1B. This will prevent the bending deformation caused by an impact against the high-strength portion 1A.

An investigation by the inventors revealed that, in an elongated metal pipe with a length LY of 6D or more, such as the metal pipe 1, supported at two supported portions separated in the longitudinal direction, the bending moment generated at and near the middle between the two supported portions of the metal pipe is largest when an impact has been applied to or near the middle between the two supported portions. In view of this finding, the high-strength portion 1A may be positioned at or near the middle between the two supported portions and the low-strength portions 1B may be positioned to sandwich the high-strength portion 1A to prevent the middle portion of the metal pipe 1 from being sharply bent by an impact. When an impact is applied to a position on the metal pipe near a supported portion, the load from the bending moment is not as large as when an impact is applied to the middle. Thus, the metal pipe is less likely to be sharply bent when an impact is applied to a position closer to a supported portion than the middle between the two supported portions than when an impact with the same strength is applied to the middle. As such, the strength distribution in the metal pipe at and near the middle between the two supported portions is important. The strength distribution in the metal pipe near the supported portions is less important than that at and near the middle between the two supported portions.

Figure 3:
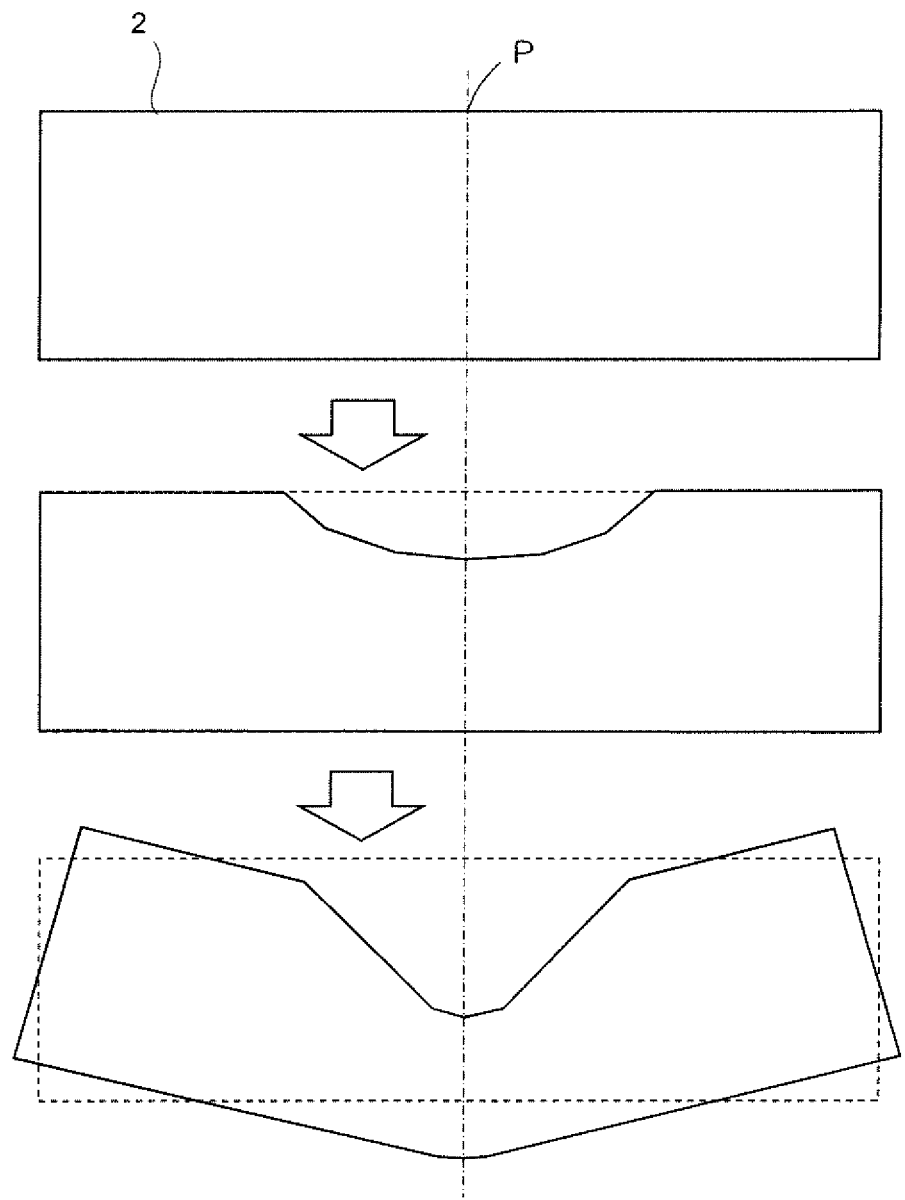
FIG. 3 illustrates the deformation behavior of a metal pipe with a uniform strength distribution.
Figure 4:
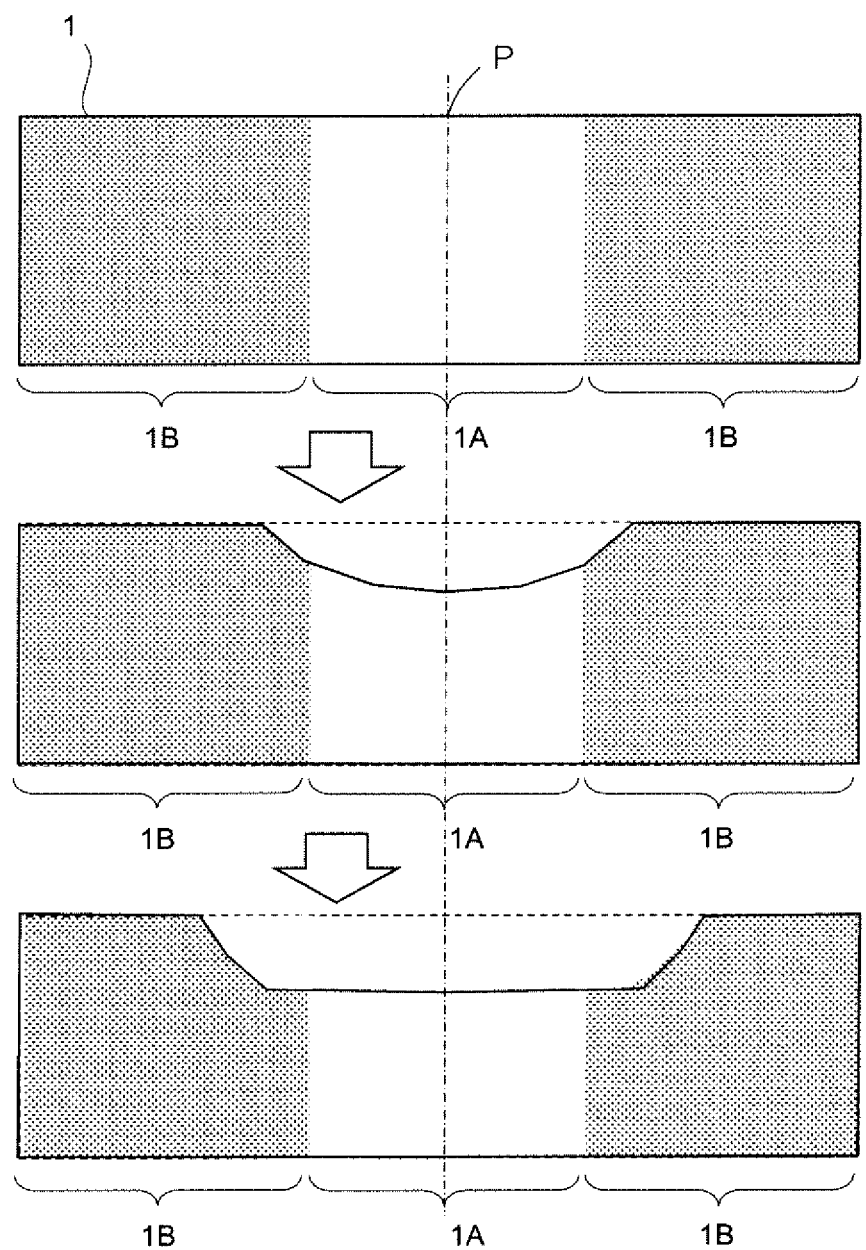
FIG. 4 illustrates the deformation behavior of a metal pipe having low-strength portions sandwiching a high-strength portion.

FIG. 3 illustrates the deformation behavior of a metal pipe 2 having a circular cross section with a uniform strength distribution. FIG. 4 illustrates the deformation behavior of the metal pipe 1, which includes the low-strength portions 1B shown in FIGS. 2A to 2C. FIGS. 3 and 4 each show the deformation behavior of the respective metal pipe found when an indenter has been caused to hit the pipe in a direction perpendicular to the longitudinal direction of the pipe. FIGS. 3 and 4 each show the structure of a side of the metal pipe as viewed in a direction perpendicular to the direction of the impact of the indenter and the longitudinal direction of the metal pipe.

As shown in FIG. 3, in the metal pipe 2 having a uniform strength distribution, an impact may cause deformation at the bending deformation initiation point P, which proceeds in a wedge shape as viewed from a side. As a result, the pipe is bent to protrude sharply in the bending direction (i.e. direction of the impact). In some cases, the metal pipe 2 may develop a crack.

As shown in FIG. 4, in the metal pipe 1 including the low-strength portions 1B (dotted in FIG. 4) sandwiching the high-strength portion 1A, deformation proceeding inward from the bending deformation initiation point P on the high-strength portion 1A, when reaching the border between the high-strength portion 1A and a low-strength portion 1B, is likely to proceed in a horizontal direction (i.e. longitudinal direction of the metal pipe 1), which provides a relatively low strength. As such, the deformation expands in the longitudinal direction, and the extent of deformation in the bend direction (i.e. impact direction) is small.

The deformation behaviors shown in FIGS. 3 and 4 are not limited to cases where an indenter has been caused to hit a metal pipe. Similar deformation behaviors may be produced when, for example, a metal pipe is bent by an axial force that compresses the metal pipe in the longitudinal direction or when a metal pipe is bent when an indenter is pressed against the pipe to apply a static force in a direction perpendicular to the longitudinal direction, as in a three-point bending test.

In the metal pipe 1 shown in FIGS. 2A to 2C, the size LA of the high-strength portion 1A is preferably not less than $(2/3)D$ and not more than $(4/3)D$, where D is the outer diameter. This will further reduce the extent of protrusion caused by an impact against the high-strength portion 1A.

The longitudinal dimension LB of each low-strength portion 1B is preferably not less than $(3/5)D$. This will further reduce the extent of deformation caused by an impact against the high-strength portion 1A. the size LB of each low-strength portion 1B is preferably not more than 2D, for example, and more preferably not more than D to provide a certain strength to the metal pipe 1.

The size LA of the high-strength portion 1A and the size LB of the low-strength portions 1B relative to the outer diameter D is not limited to the above-discussed relationships, i.e. cases where $((2/3)D){\leq}LA{\leq}3D)$, or more preferably $((2/3)D{\leq}LA{\leq}(4/3)D)$ or $((3/5)D{\leq}LB)$, is strictly satisfied. Cases with errors that allow one to deem the sizes satisfying the above-discussed relationships are also contemplated. Further, in the implementation shown in FIG. 2, the border between a low-strength portion 1B and the high-strength portion 1A extends along a line perpendicular to the longitudinal direction of the metal pipe. The border between a low-strength portion and the high-strength portion is not limited to this implementation. For example, instead of being perpendicular to the longitudinal direction of the metal pipe, the border between a low-strength portion and the high-strength portion may meander. In such implementations, the border between a low-strength portion and the high-strength portion is deemed to be located in the middle between the position on the meandering border that is furthest into the low-strength portion and the position that is furthest into the high-strength portion. If a cross section of the metal pipe is elliptical, a ratio between the major and minor axes not more than 1.5 is tolerable. In an elliptical pipe, the diameter as measured in the direction in which an impact is input is deemed to be the outer diameter D. For example, if the pipe is applied as a frame member of an automobile, the diameter as measured in the direction from the outside to the inside of the vehicle body is deemed to be the outer diameter D. If the metal pipe is elliptical and twisted, the length of the minor axis is deemed to be the outer diameter D.

The high-strength portion 1A is preferably positioned in the middle of the metal pipe 1 as determined along the longitudinal direction. That is, at least a portion of the high-strength portion 1A is preferably positioned in the middle of the metal pipe 1 as determined along the longitudinal direction. In other words, the middle portion of the metal pipe 1 as determined along the longitudinal direction preferably forms the high-strength portion 1A. This will prevent the sharp bending caused by an impact against the middle of the metal pipe 1. For example, in a metal pipe 1 with its both ends supported, sharp-bend deformation in the middle which has the largest moment associated with an impact is effectively prevented.

In the implementation shown in FIG. 2A, the metal pipe 1 extends straight in the longitudinal direction. Alternatively, the metal pipe 1 may be curved along the longitudinal direction. For example, the metal pipe 1 may be curved to be convex in a direction perpendicular to the longitudinal direction.

Figure 5A:
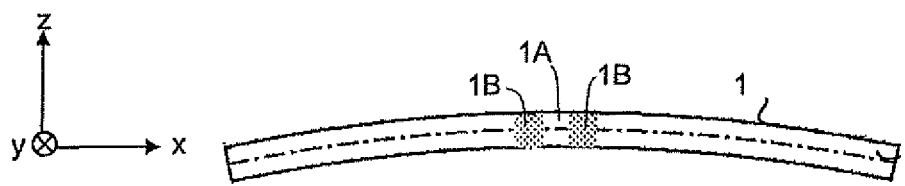
FIG. 5A is a side view of an exemplary curved metal pipe.
Figure 5B:
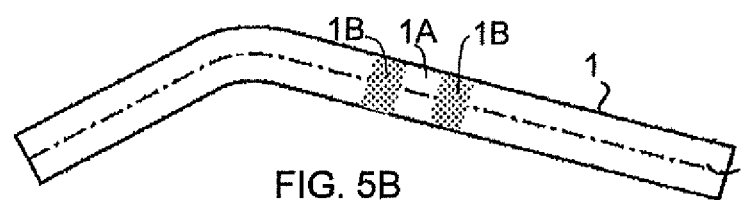
FIG. 5B is a side view of another exemplary curved metal pipe.
Figure 5C:
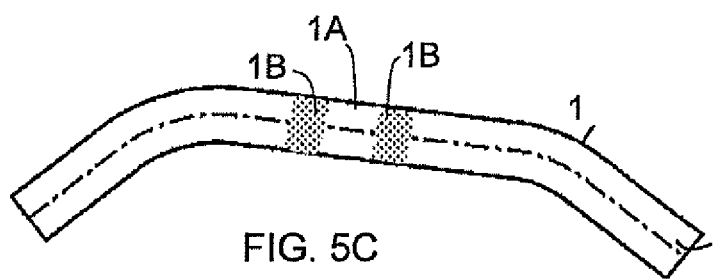
FIG. 5C is a side view of yet another exemplary curved metal pipe.
Figure 5D:
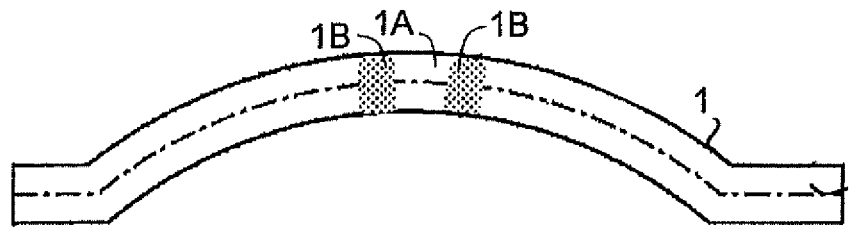
FIG. 5D is a side view of still another exemplary curved metal pipe.

FIGS. 5A to 5D are side views of example implementations of the metal pipe 1 that are curved along the longitudinal direction. In the implementations shown in FIGS. 5A to 5D, the metal pipe 1 is curved to be convex in a direction perpendicular to the longitudinal direction. In FIG. 5A, the metal pipe 1 is curved with a constant curvature along the entire length. In FIGS. 5B and 5C, the curvature varies depending on the position as determined along the longitudinal direction of the metal pipe 1. In FIG. 5D, a longitudinal section of the metal pipe 1 is curved. In the implementations shown in FIGS. 5A and 5D, the metal pipe 1 is curved so as to be left-right symmetrical as viewed in a direction perpendicular to the left-right longitudinal direction. In FIGS. 5B, 5C and 5D, the metal pipe 1 includes a portion that is curved (i.e. curved portion) and a portion extending along a straight line (i.e. straight portion). In the implementation shown in FIG. 5C, curved portions are positioned on both ends of the straight portion as determined along the longitudinal direction. That is, a straight portion is positioned between the curved portions. In the implementation shown in FIG. 5D, straight portions are positioned on both ends of the curved portion as determined along the longitudinal direction.

Curving the metal pipe 1 to be convex in a direction perpendicular to the longitudinal direction, as discussed above, improves the impact resistance to an impact in the direction opposite to the convex direction of the curve. For example, a structural member including a curved metal pipe 1 with its both ends supported has a high impact resistance to an impact in the direction opposite to the convex direction of the curve.

In the implementations shown in FIGS. 5A and 5D, the pair of low-strength portions 1B and a high-strength portion therebetween are located in the curved portion of the metal pipe 1. In the implementations shown in FIGS. 5B and 5C, the pair of low-strength portions 1B and the high-strength portion 1A therebetween are located in the straight portion of the metal pipe 1. When the low-strength portions 1B and high-strength portion 1A are located in the straight portion, the high-strength portion 1A may be located in the middle of the straight portion, for example. Thus, the high-strength portion 1A is located in a portion where a high moment is caused by a received impact.

[Applications as Structural Members or in Vehicles]

The metal pipe 1 discussed above may be used as a structural member. In such cases, for example, the structural member is formed by a metal pipe 1 with two supported positions that are separated in the longitudinal direction of the metal pipe 1. In such cases, the metal pipe 1 has two connections, which are portions to be connected to another member. The metal pipe 1 is supported by the other member at these connections. The connections may also be referred to as supported portions. The metal pipe 1 is fixed to the other member via the connections. That is, the metal pipe 1 is connected to the other member via the connections so as to be unmovable relative to each other. The connections of the metal pipe 1 are joined to the other member by means of fastening members or by welding, for example. Three or more connections may be provided.

The two connections are positioned to be separate by 6D or more in the longitudinal direction of the metal pipe 1. If the distance between the connections is less than 6D, the metal pipe is unlikely to be sharply bent even if no particular measures are taken, which means that the invention is not very effective.

For example, if the metal pipe 1 is used as a vehicle structural member, the metal pipe 1 is supported by two connections separated in the longitudinal direction of the metal pipe 1 and, with this condition kept, is attached to the vehicle. The metal pipe 1 may serve as a structural member in a vehicle body, a bumper or a vehicle door, for example. Thus, a vehicle, bumper or vehicle door including the metal pipe 1 is included in the embodiments of the present invention.

In a structural member including a metal pipe 1 supported at two connections, a pair of low-strength portions 1B and a high-strength portion 1A therebetween are positioned between the two connections. This prevents sharp bending of portions of the metal pipe 1 where a large moment is generated when an impact has been applied. This will provide a structural member with high impact resistance.

For example, the high-strength portion 1A is positioned at the position that is equally distant from the two connections (i.e. middle between the two connections). For example, a structural member including a metal pipe 1 having a high-strength portion 1A in the middle along the longitudinal direction, with its both ends supported. "Both ends" as used herein means both ends of the metal pipe 1 and portions near them.

If a metal pipe 1 is mounted on the vehicle, the metal pipe 1 is preferably positioned such that the longitudinal profile of the metal pipe 1 extends along the outer shape of the vehicle. That is, the metal pipe 1 is mounted such that an impact derived from a crash of the vehicle is in a direction perpendicular to the longitudinal direction of the metal pipe 1. The high-strength portion 1A is positioned in the middle of the metal pipe 1 as determined along the longitudinal direction, and the low-strength portion 1B is positioned to sandwich it. As such, when the metal pipe 1 receives an impact in its middle from outside the vehicle, the metal pipe 1 protrudes inwardly of the vehicle to a smaller extent. This will further reduce the possibility of the metal pipe 1 contacting a device or person in the vehicle. For example, upon a crash, the metal pipe 1 is prevented from being sharply bent toward the interior of the passenger cabin. This will further improve safety.

The metal pipe 1 may be curved, as discussed above. For example, the metal pipe is preferably mounted on the vehicle to be convex toward the outside of the vehicle. In such implementations, the metal pipe 1 is curved to be convex toward the outside of the vehicle. Thus, when the metal pipe 1 receives an impact from the outside of the vehicle, the pipe is less likely to be bent sharply.

The metal pipe 1 may serve as a structural member constituting part of a vehicle body, a bumper or a vehicle door. For example, the metal pipe 1 may be used in a member constituting part of the vehicle body, such as an A-pillar, a B-pillar, a side sill, a roof rail, a floor member, and a front side member. Alternatively, the metal pipe 1 may be used in a member to be mounted on the vehicle body, such as a door impact beam or a bumper.

Figure 6A:
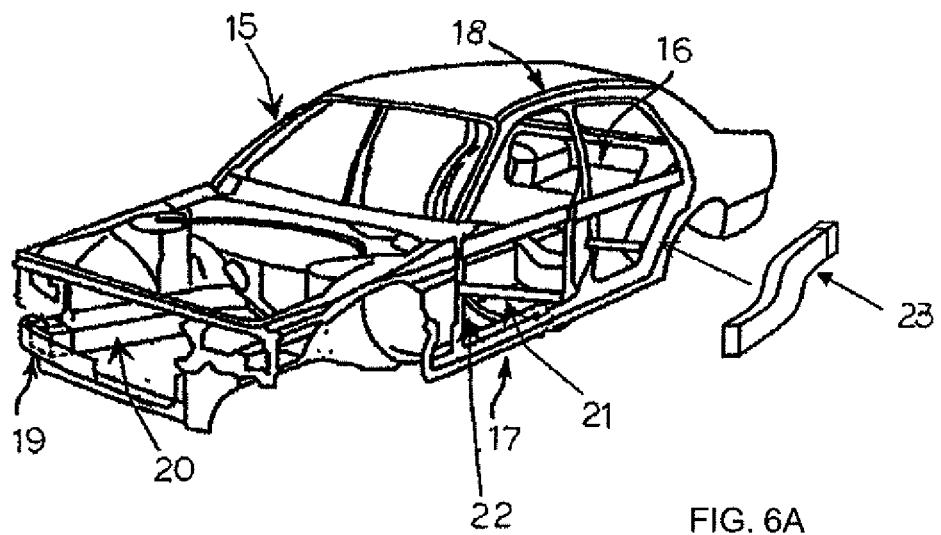
FIG. 6A shows an exemplary structural member mounted on a vehicle.

FIG. 6A shows an exemplary structural member mounted on a vehicle that uses a monocoque structure. In the implementation shown in FIG. 6A, an A-pillar 15, a B-pillar 16, a side sill 17, a roof rail 18, a bumper 19, a floor side member 20, a door impact beam 21, a floor member 22 and a rear side member 23 are used as vehicle structural members. At least one of these vehicle structural members may be constituted by the metal pipe 1 discussed above.

If the bumper 19 is formed by the metal pipe 1, the metal pipe 1 is constructed such that its both ends are supported by the front side member 20. In this construction, the moment from a load is at its maximum when an impact is applied to the middle of the bumper 19. A high-strength portion 1A is positioned in the middle of the bumper 19 as determined along its left-right direction, and low-strength portions 1B are positioned to sandwich it. This will prevent the bumper 19 from being bent sharply by an impact on the middle of the bumper.

If the door impact beam 21 is formed by the metal pipe 1, brackets are provided on both ends of the metal pipe 1 and are used to mount the pipe. Welding may be used without providing brackets. The metal pipe 1 is mounted on the door frame using the brackets on both ends. In any case, the high-strength portion 1A is positioned in the middle of the metal pipe 1 to prevent sharp bending of portions where the largest moment is generated upon reception of an impact.

Figure 6B:
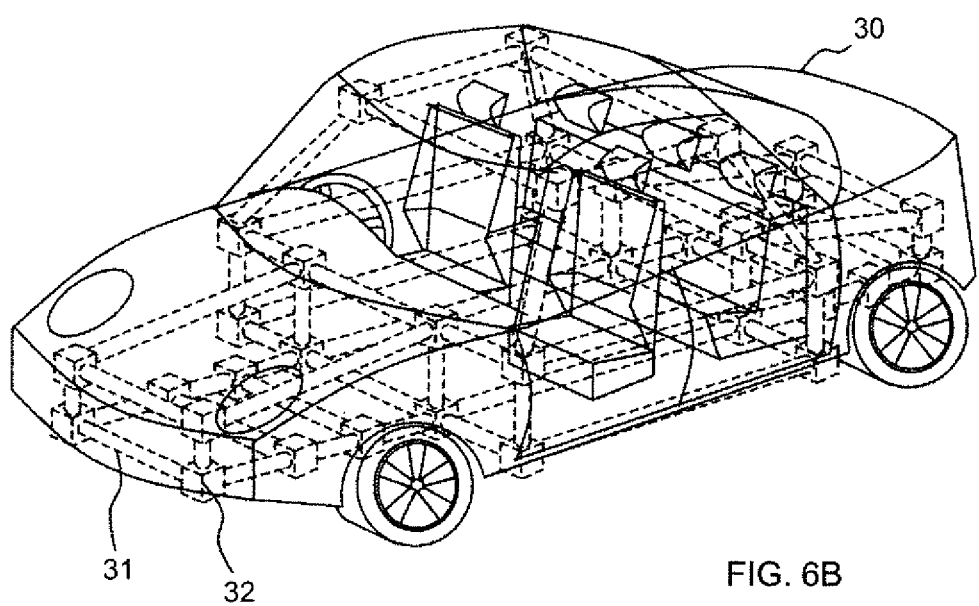
FIG. 6B shows an exemplary vehicle including a vehicle body with a space-frame structure.

The metal pipe 1 may be applied to not only vehicles using a monocoque structure, but also vehicles using a frame structure. FIG. 6B shows the vehicle including a vehicle body with a space-frame structure disclosed in JP 2011-37313 A. The vehicle body with a space-frame structure includes a plurality of pipes 31 and a joint 32 coupling the pipes 31. The pipes 31 are positioned inside a body shell 30, which covers the exterior of the vehicle body. The pipes 31 includes pipes extending in the top-bottom direction, pipes extending in the front-rear direction, and pipes extending in the left-right direction. At least some of the pipes 31 may each be formed by the metal pipe 1 discussed above. Applying the metal pipe 1 discussed above as a pipe (or tube) constituting part of a vehicle with a space-frame structure is effective as the pipe cannot be bent deeply into the interior of the vehicle body, in which a passenger or an engine is positioned.

The above-discussed effects are significant when the metal pipe 1 constituting a structural member of a vehicle is made of an ultrahigh strength steel with a tensile strength (i.e. tensile strength of the portions other than the low-strength portions 1B) not less than 780 MPa (or a yield strength not less than 400 MPa). The effects are still more significant when the portions of the metal pipe 1 other than the low-strength portions 1B has a strength represented by a tensile strength not less than 980 MPa (or yield strength not less than 500 MPa).

The metal pipe 1 may be used as various vehicle structural members and is not limited to four-wheel vehicles, such as the automobile shown in FIG. 6, but may also be used as a structural member of a two-wheel vehicle, for example. Applications of a structural member constituted by the metal pipe 1 are not limited to vehicles. For example, the metal pipe 1 may be used as a structural member of an impact-resistant container, a building, a ship, an airplane, or the like.

The manners in which the metal pipe 1 is used as a structural member are not limited to implementations where both ends of the metal pipe 1 are connected to another member. Another member may be connected to arbitrary two positions on the metal pipe 1 that are distant by 6D or more in the longitudinal direction. That is, the two connections may be disposed at arbitrary positions on the metal pipe 1, which are not limited to both ends of the pipe.

[Manufacturing Process]

The metal pipe 1 may be entirely formed from the same material. For example, the metal pipe 1 may be formed from a steel plate. For example, one steel pipe may be rolled up and one edge of the steel plate may be joined to the opposite edge by welding, for example, to form a tubular structural member with a round cross section (i.e. round pipe). Alternatively, a solid column may be pierced to form an axial bore to form the metal pipe 1. If a round pipe is to be curved, for example, bending methods may be used such as press bending, stretch bending, compression bending, roll bending, MOS bending or eccentric plug bending.

The process for manufacturing the metal pipe 1 includes the step of forming the low-strength portions in a material. The method of forming the low-strength portions is not limited to any particular one; for example, a material may be locally heated and quenched by a method such as a laser method or high-frequency heating to create a metal pipe 1 including hardened portions. In such cases, the portions that have not been quenched provide low-strength portions with relatively low strength. Alternatively, thermal refining may be performed to strengthen an entire round pipe, which is then locally annealed to form low-strength portions.

Alternatively, a tubular member may be moved in an axial direction to successively perform the steps of heating, providing a bending moment and cooling to produce a metal pipe 1 that is curved along the longitudinal direction. During this method, an induction heating coil is disposed around a tubular member, which is locally heated to temperatures that allow plastic deformation. The heated portion is moved in a tube direction and, with the portion kept hot, a movable grasping means such as a movable roller dice positioned on the tubular member downstream of the induction heating coil is moved to provide a bending moment. The portion that has been bent in this manner is cooled by a cooling device located between the induction heating coil and movable grasping means. During this process, for example, conditions for heating and cooling may vary on the periphery of the tubular member to form low-strength portions in the tubular member.

The metal pipe 1 may be manufactured by other methods. Tailored blank or other known methods may be used to form the metal pipe 1 with low-strength portions. If tailored blank is used, the present invention may be used in a pipe of other metals than steel, such as aluminum.

In the metal pipe 1 discussed above, the distribution of yield strength in the high-strength portion 1A may not be uniform. In a stationary range, the variation in yield strength is normally within ±10%. 90% of the maximum, Smax, of yield strength in the high-strength portion 1A defines the yield strength (or reference strength) of the high-strength portion 1A, SA (SA=0.9 Smax). The range of yield strengths larger than 0.85 SA and smaller than 0.9 SA (i.e. 85% to 90% of SA) (transitional range) is deemed to be part of the high-strength portion 1A. Yield strength in the high-strength portion 1A is larger than 0.85 SA (i.e. 85% of SA). That is, the range of yield strengths larger than 0.85 SA represents the high-strength portion 1A.

Figure 7:
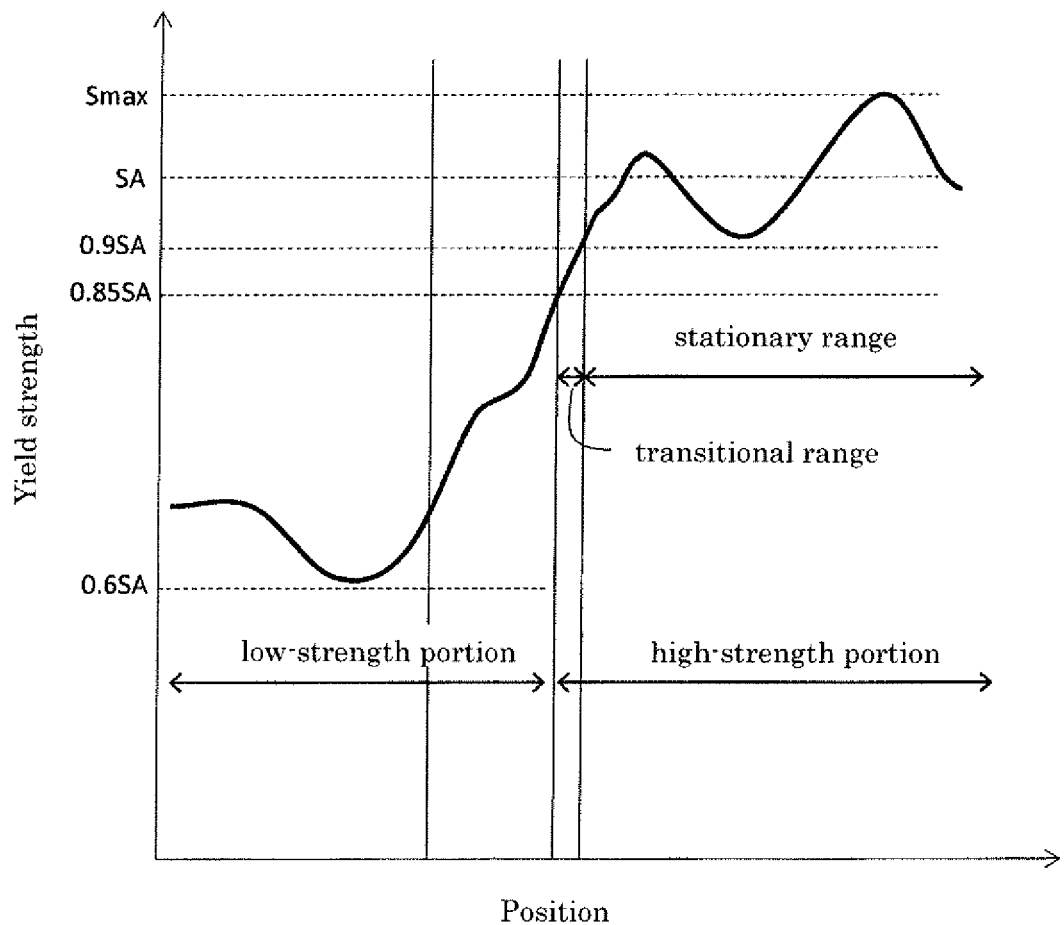
FIG. 7 shows an exemplary distribution of yield strength in a portion including the border between a low-strength portion and the high-strength portion.

FIG. 7 shows an example of the distribution of yield strength in a portion of the pipe including the border between a low-strength portion and the high-strength portion. In FIG. 7, the longitudinal axis represents yield strength, while the horizontal axis represents the position in the y-direction. In the example of FIG. 7, 90% of the maximum Smax of yield strength in the high-strength portion (0.9 Smax) defines the yield strength SA of the high-strength portion. In the high-strength portion, the range of yield strengths not less than 0.9 SA is referred to as constant range. Further, the range of yield strengths more than 0.85 SA and less than 0.9 SA is the transitional range, which stretches between the low-strength portion and the constant range of the high-strength portion. The transitional range is deemed to be part of the high-strength portion. That is, the position of the yield strength of 0.85 A represents the border between the low-strength portion and high-strength portion. That is, the range of yield strengths more than 0.85 SA forms the high-strength portion, while the range of yield strengths not more than 0.85 SA forms the low-strength portion.

The yield strength of the low-strength portion is not less than 0.6 SA and not more than 0.85 SA (60 to 85% of SA). Even if the metal pipe 1 includes some portions surrounded by a low-strength portion and having a strength not more than 0.6 SA, they are deemed to be part of the low-strength portion if they are small enough that their influence on the deformation behavior of the metal pipe 1 is negligible.

EXAMPLES

Figure 8A:
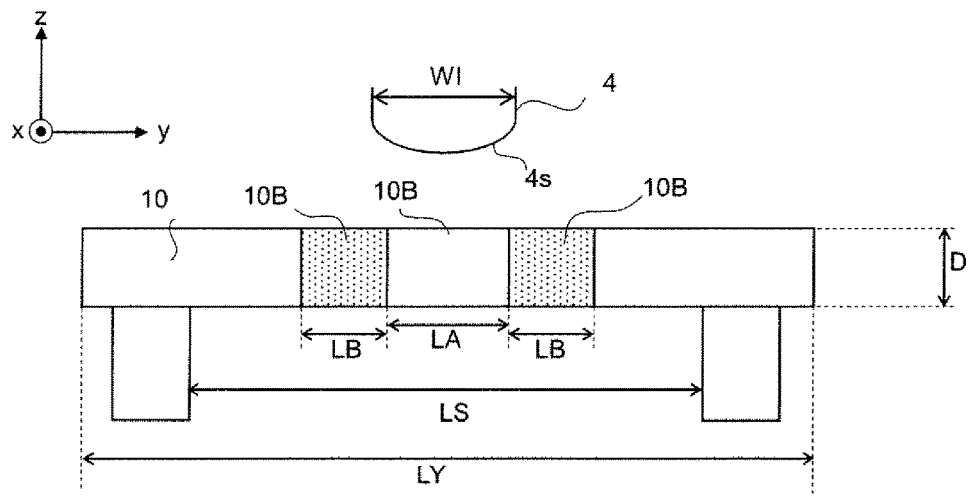
FIG. 8A shows an analysis model in a simulation.

The present examples used simulations to analyze the deformation of metal pipes with circular cross sections occurring when an indenter was caused to hit the metal pipes. FIG. 8A shows the configuration of an analysis model in the simulations. In the present simulation, a metal pipe 10 was placed on two stands 3 so as to stretch over and between them and, with this condition kept, an indenter (impacter) 4 was caused to hit the middle of the metal pipe 10 as determined along its longitudinal direction, and the deformation behavior was analyzed. The mass of the indenter 4 was 350 kg: the width WI of the indenter 4 as measured in the y-direction was 160 mm; the radius of curvature R of the impact surface 4s of the indenter 4 was 150 mm; and the initial speed of the indenter 4 was 4 m/sec. The coefficient of friction was 0.1. The metal pipe 10 had a cross section that was circular in shape. The outer diameter D of the metal pipe 10 was 50 mm; the plate thickness of the metal pipe 10 was 1.4 mm; and the length LY of the metal pipe 10 was 1000 mm. The distance LS between the stands 3 was 400 mm.

Figure 8B:
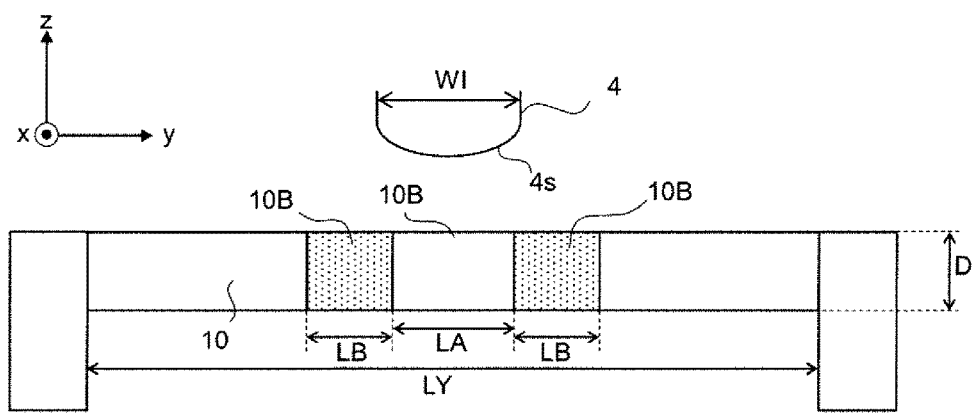
FIG. 8B shows an analysis model in another simulation.

FIG. 8B shows the configuration of another analysis model in the simulations. In the example of FIG. 8B, both ends of the metal pipe 10 were joined to the two stands 3. The results of the simulation of the analysis model of FIG. 8B were similar to those of the simulation of the analysis model of FIG. 8A.

Impact simulations were conducted where the yield strength of the low-strength portions 10B was 100 kgf/mm², and the yield strength of the other portions including the high-strength portion 10A was 120 kgf/mm² (the strength ratio between the high-strength portion 10A and low-strength portions 10B being about 0.83), with different sizes LA of the high-strength portion 10A and different sizes LB of the low-strength portions 10B.

Figure 9A:
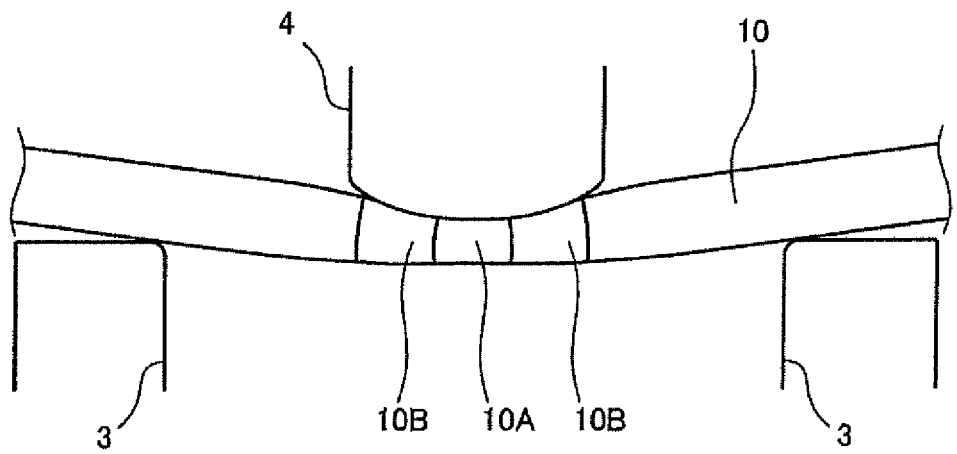
FIG. 9A shows a result of a simulation of the deformation of a metal pipe.
Figure 9B:
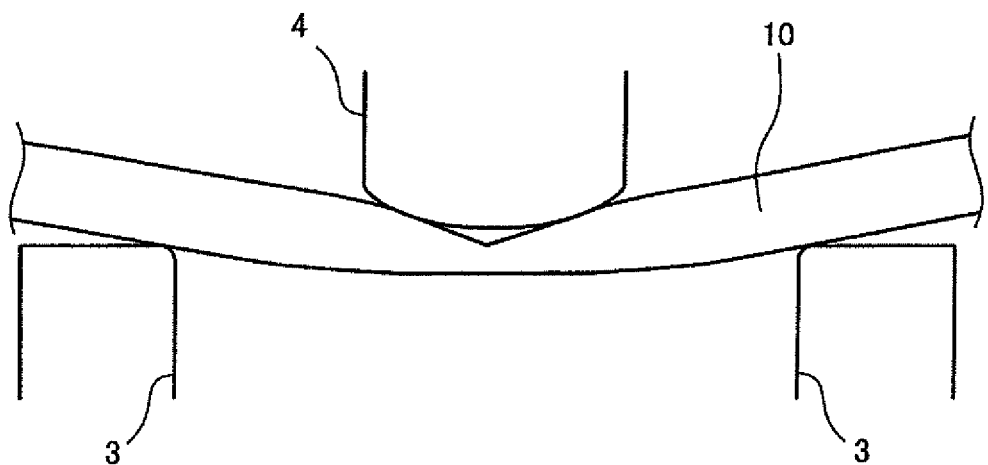
FIG. 9B shows a result of a simulation of the deformation of another metal pipe.

FIGS. 9A and 9B each show the result of a simulation of the deformation of the metal pipe 10 occurring when the amount of intrusion of the indenter 4 was 40 mm. FIG. 9A shows how the metal pipe 10 may be deformed when the size LA of the high-strength portion 10A between the low-strength portions 10B was equal to the outer diameter D of the metal pipe 10 (LA=D). FIG. 9B shows how the metal pipe 10 may be deformed without the low-strength portion 10B (LA=LB=0).

The result shown in FIG. 9A indicates that the walls of the metal pipe 10 are pressed and crushed by the indenter 4, i.e. a deformation mode called "cross-section crush". In the result shown in FIG. 9A, the surface of the metal pipe 10 is deformed along the shape of the impact surface 4s of the impacter 4. In the result shown in FIG. 9B, the walls of the metal pipe 10 are bent to protrude sharply, exhibiting a deformation mode called "sharp bending". In the result shown in FIG. 9B, the surface of the metal pipe 10 is bent so sharply as to be separated from the impact surface 4s of the impacter 4. These simulation results reveal that, under the condition of LA=D, sharp bending does not occur when the amount of intrusion by the indenter 4 is 40 mm, providing a suitable deformation behavior.

Table 1 given below shows deformation behavior values obtained from the simulation results where the strength ratio discussed above was 0.83 (the yield strength of the low-strength portions 10B being YP 100 kgf/mm² and the yield strength of the other portions including the high-strength portion 10A being YP 120 kgf/mm²), with different sizes LA of the high-strength portions 1A and different plate thicknesses t of the metal pipe 10. In Table 1, "Excellent" in the column labeled "Deformation behavior" means very good behavior, "Good" means good behavior, and "Poor" means poor behavior. These evaluations of deformation behaviors were made based on the amount of intrusion by the indenter found when sharp bending occurred. The amount of intrusion by the indenter may also be referred to as impacter stroke or indenter displacement.

TABLE 1

| Case | LA | t [mm] | Deformation behavior |
|---|---|---|---|
| 1 | 0 | 1.4 | Poor |
| 2 | 2D/3 | 1.4 | Excellent |
| 3 | D | 1.4 | Excellent |
| 4 | 4D/3 | 1.4 | Excellent |
| 5 | 2D | 1.4 | Good |
| 6 | 8D/3 | 1.4 | Good |
| 7 | 3D | 1.4 | Good |
| 8 | 10D/3 | 1.4 | Poor |
| 9 | 4D | 1.4 | Poor |
| 10 | 2D | 1.0 | Good |
| 11 (=5) | 2D | 1.4 | Good |
| 12 | 2D | 1.8 | Good |

Figure 10:
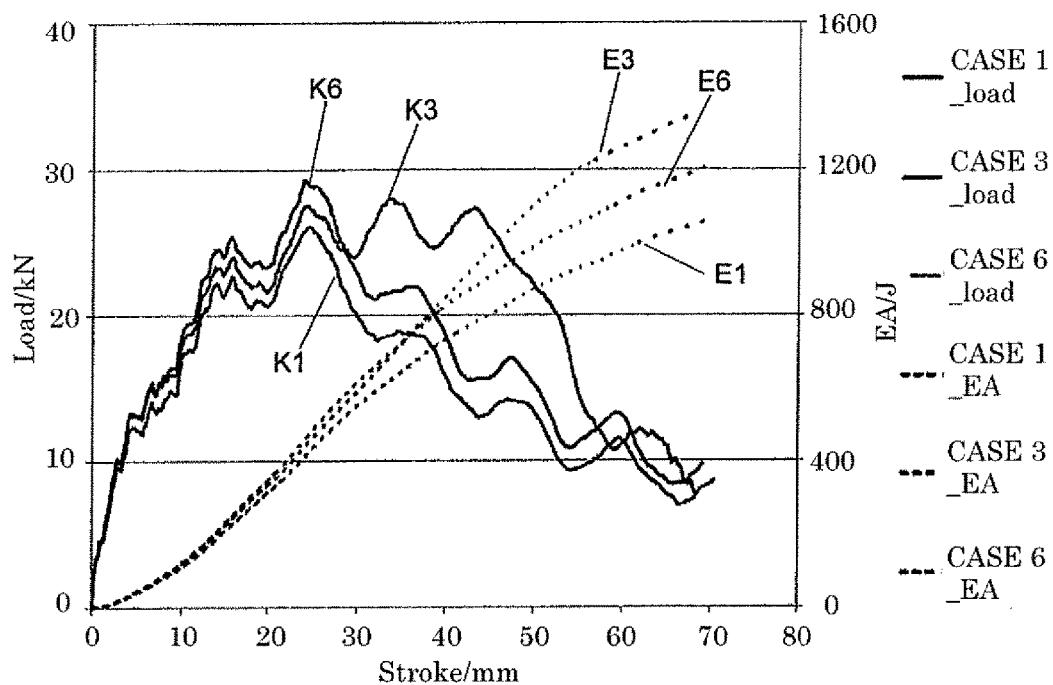
FIG. 10 is a graph showing results of simulations of load and absorbed energy.

FIG. 10 shows the results of the simulations of the load applied to and energy absorbed by the metal pipe 10 under the conditions of Case 1, Case 3 and Case 6 shown in Table 1. In FIG. 10, the horizontal axis indicates the stroke, i.e. amount of intrusion (mm) of the indenter 4, while the vertical axis indicates load (kN) and absorbed energy (J). Solid line K1 indicates the relationship between load and stroke for Case 1 (LA=0). Solid line K3 indicates the relationship between load and stroke for Case 3 (LA=D). Solid line K6 indicates the relationship between load and stroke for Case 6 (LA=8D/3). Broken line E1 indicates absorbed energy for Case 1. Broken line E3 indicates absorbed energy for Case 3. Broken line E6 indicates absorbed energy for Case 6.

In Case 6, the sharp-bending mode is less likely to occur than in Case 1 and load is kept at high levels. As a result, absorbed energy is better for Case 6 than Case 1. In Case 3, the sharp-bending mode is even less likely to occur than in Cases 1 and 6, thereby achieving very high absorbed energy.

Figure 11:
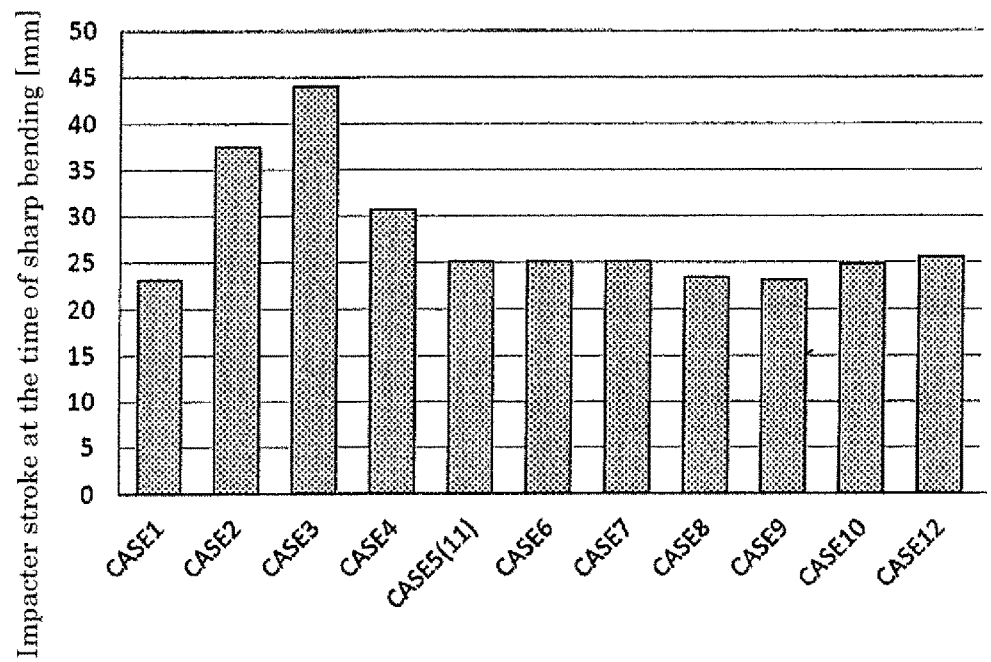
FIG. 11 is a graph showing results of simulations of the impacter stroke found when a sharp bend occurs.

FIG. 11 is a graph showing the results of the simulations of the impacter stroke at the time of sharp bending for Cases 1 to 12 in Table 1. In the results shown in FIG. 11, the impacter stroke at the time of sharp bending is larger for Cases 2 to 7 and 10 to 12 than for Case 1, i.e., when no low-strength portions 10B are provided. This shows that sharp bending is less likely to occur for Cases 2 to 7 and 10 to 12 than when no low-strength portions 10B are provided. Further, the impacter stroke at the time of sharp bending is prominently high for Cases 2 to 4. This shows that sharp bending is particularly unlikely to occur for Cases 2 to 4.

Figure 12:
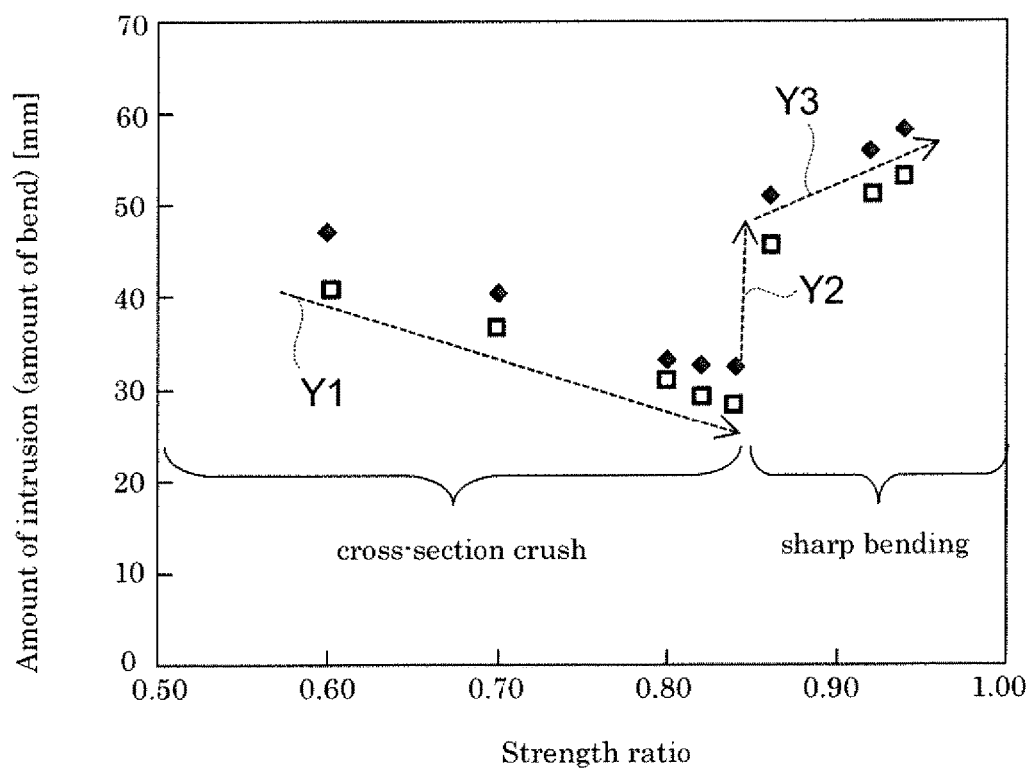
FIG. 12 is a graph showing the amount of deformation due to bend deformation found when an impact load is input with different strength ratios between the low-strength portions and high-strength portion.

Impact simulations were conducted with different ratios between the strength of the low-strength portions 10B and the strength of the other portions including the high-strength portion 10A. FIG. 12 is a graph showing the amount of deformation associated with the bending deformation found when impact loads were input with different strength ratios between the low-strength portion 10B and the other portions including the high-strength portion 10A. In FIG. 12, the vertical axis indicates the amount of intrusion in (or amount of protrusion of) the metal pipe 10 as measured in the direction of impact (z-direction). The horizontal axis indicates the ratio of the strength of the low-strength portions 10B to the strength of the high-strength portion 10A (strength ratio=strength of low-strength portions/strength of high-strength portion). In the graph of FIG. 12, the plotted rhombuses indicate results obtained when the yield strength of the high-strength portion was YS 120 kgf/mm², while the plotted rectangles indicates results obtained when the yield strength of the high-strength portion was 145 kgf/mm².

In the section with strength ratios of 0.60 to 0.85, the amount of intrusion decreased as strength ratio increased (arrow Y1). In this section, the deformation mode of the metal pipe 10 was cross-section crush. Within this section, when the strength of the low-strength portions 10B was low (strength ratio was not higher than 0.60), the deformation was cross-section crush but with a large amount of intrusion, substantially equal to the amounts of intrusion for strength ratios of 0.85 and higher. When strength ratio exceeded 0.85, the amount of intrusion rapidly increased (arrow Y2). Further, when strength ratio increased in the section of strength ratios of 0.85 and higher, the amount of intrusion increased as strength ratio increased (arrow Y3). This is presumably because, at the border strength ratio of 0.85, the deformation mode transitioned from cross-section crush to sharp bending. Thus, when the strength of the low-strength portions 10B was too high (i.e. strength ratio was high), the pipe was deformed with sharp bending, resulting in large amounts of intrusion. The results shown in FIG. 12 confirm that, to reduce the amount of intrusion associated with the sharp bending caused by an impact, strength ratio is preferably 60 to 85%, and more preferably 70 to 85%.

Although an embodiment of the present invention has been described, the above-described embodiment is merely an example for carrying out the invention. Accordingly, the present invention is not limited to the above-described embodiment, and the embodiment may be modified appropriately without departing from the spirit of the invention.

The cross-sectional shape of the metal pipe 1 is not limited to an exact perfect circle. The cross-sectional shape of the metal pipe 1 may be a flat ellipse that may be considered to be generally circular. Further, a portion of the outer periphery of a cross section of the metal pipe 1 may form a straight line, rather than an arc. The metal pipe of the present invention may be suitably used in various fields in the form of a steel pipe; however, the metal pipe is not limited to a steel pipe, and may be an aluminum pipe or other metal pipes.

EXPLANATION OF CHARACTERS

1: metal pipe
1A: high-strength portion
1B: low-strength portions

The invention claimed is:

1. A metal pipe comprising:
a circular cross section with an outer diameter D and a length not less than 6D,
the metal pipe further comprising:
a high-strength portion disposed along an entire circumference of the metal pipe to extend a dimension, as measured in a longitudinal direction of the metal pipe, that is not less than $2/3$D and not more than $4/3$D, the high-strength portion having a yield strength not less than 500 MPa; and
low-strength portions disposed along the entire circumference of the metal pipe to be arranged in the longitudinal direction of the metal pipe to sandwich the high-strength portion, the low-strength portions having a yield strength of 60 to 85% of that of the high-strength portion.

2. The metal pipe according to claim 1, wherein a dimension of the low-strength portions as measured in the longitudinal direction of the metal pipe is not less than $3/5$D.

3. The metal pipe according to claim 1, wherein the high-strength portion is located in a middle of the metal pipe as determined along the longitudinal direction.

4. The metal pipe according to claim 1, wherein the metal pipe is curved.

5. A vehicle body, bumper or vehicle door comprising:
a metal pipe having a circular cross section with an outer diameter D, the metal pipe further comprising:
connections configured to be connected to another member, the connections being portions of the metal pipe located at two positions separated from each other by 6D or more in a longitudinal direction of the metal pipe;
a high-strength portion disposed between the connections along an entire circumference of the metal pipe to extend a dimension, as measured in the longitudinal direction, that is not less than $2/3$D and not more than $4/3$D, the high-strength portion having a yield strength not less than 500 MPa; and
low-strength portions disposed along the entire circumference of the metal pipe to be arranged in the longitudinal direction of the metal pipe to sandwich the high-strength portion, the low-strength portions having a yield strength of 60 to 85% of that of the high-strength portion.

6. The vehicle body, bumper or vehicle door according to claim 5, wherein a dimension of the low-strength portions of the metal pipe as measured in the longitudinal direction of the metal pipe is not less than $3/5$D.

7. The vehicle body, bumper or vehicle door according to claim 5, wherein the high-strength portion of the metal pipe is located midway between the two connections.

8. The vehicle body, bumper or vehicle door according to claim 5, wherein the metal pipe is curved to be convex toward an outside of a vehicle.

9. The vehicle body according to claim 5, wherein the vehicle body has a space-frame structure.

* * * * *